United States Patent Office 3,443,546
Patented May 13, 1969

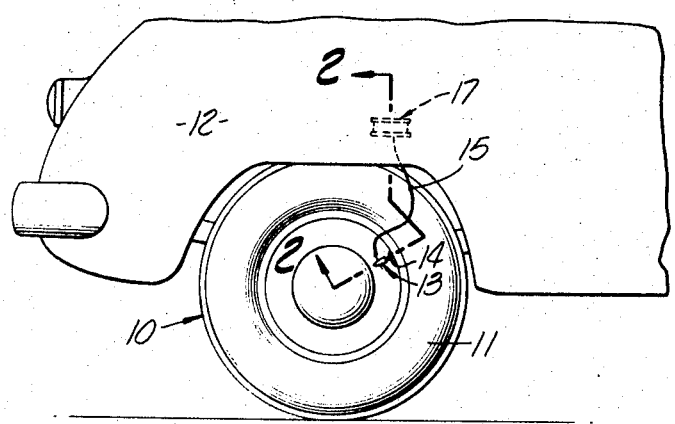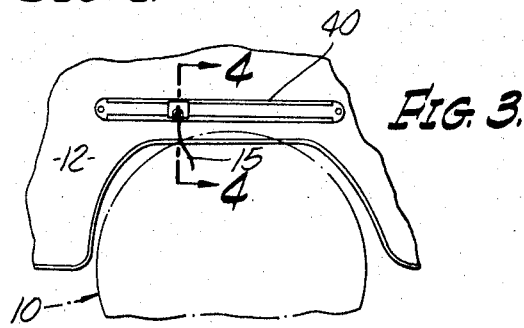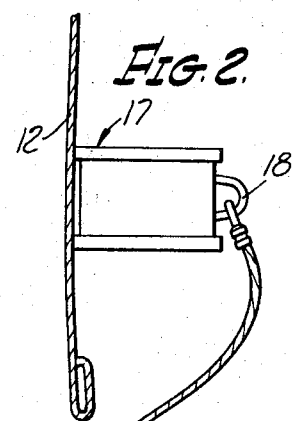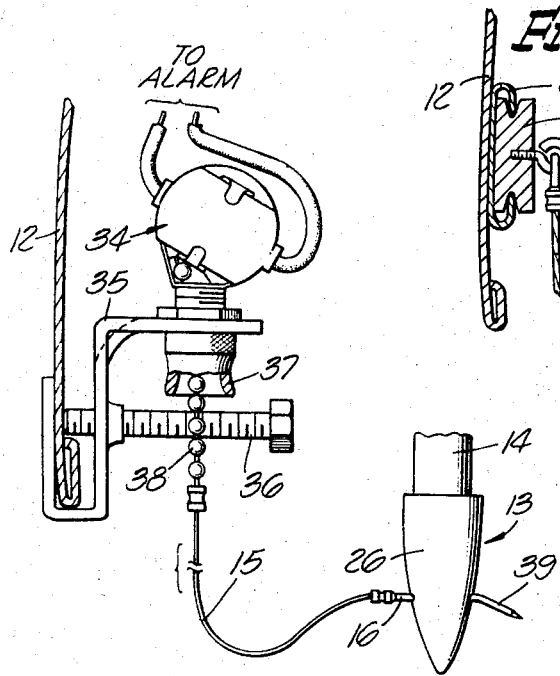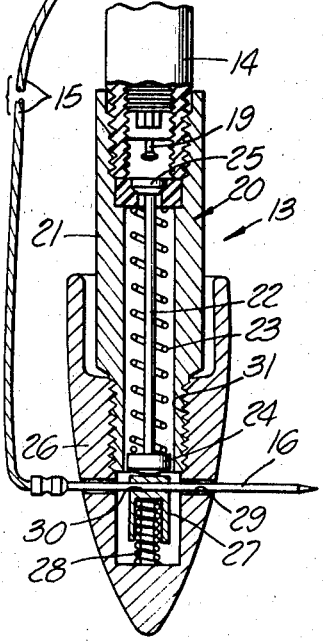

---

3,443,546
CAR THEFT PREVENTION APPARATUS
Neal B. Couey, 7453 Victoria Ave.,
Highland, Calif. 92346
Filed Sept. 5, 1967, Ser. No. 665,630
Int. Cl. G08b *13/12*
U.S. Cl. 116—81                     6 Claims

ABSTRACT OF THE DISCLOSURE

A valve control device is threaded onto the valve stem of one of the automobile tires. An actuating cord is connected between the valve control device and a connection post on the adjacent underside of the fender. Rotation of the wheel during theft of the auto actuates the valve control device to allow air to escape from the tire.

A further aspect is the provision of an alarm (light, siren, or the like) which is simultaneously tripped by the actuating cord.

The present invention relates generally to apparatus for preventing the theft of an automobile, and more particularly to such apparatus for automatically placing the automobile in a temporarily inoperative state upon unauthorized use.

Background of the invention

Automobile thefts are a significant percentage of all crimes committed in modern society and the percentage apparently shows all expectation of increasing still further. Moreover, it is the usual result when automobiles are stolen, that they are damaged to a considerable extent, both in external appearance such as smashed fenders, windows, and the like, and the engine itself is frequently damaged due to having been run at high rates of speed without oil and/or lubrication. For this reason, it is a highly desirable thing to be able to prevent an automobile from being stolen, at the outset even if recovery could have been assured.

It is therefore a primary object and feature of the present invention to provide apparatus for preventing the theft of an automobile.

Another object of the invention is to provide auto theft prevention apparatus which is easily and quickly applied to the auto and operates to make the auto inoperative for a period of time substantially immediately upon initiation of unauthorized use.

A further object of the invention is the provision of auto theft prevention apparatus as in the above objects in which there is further provided alarm apparatus that operates simultaneously to provide visual and/or aural indication of unauthorized use of the vehicle.

Summary of the invention

Briefly, the invention includes a selectively operable spring-loaded plunger device which is threaded onto the valve stem of one of the automobile tires. A removable pin is included for locking the spring-loaded plunger into inoperative condition. An actuating member is connected from the pin to a support member either permanently or temporarily secured to the underside of the adjacent auto fender. When the auto is attempted to be driven away by the thief, motion of the wheel will cause the actuating member to pull the pin from the plunger apparatus, thereby releasing the spring-loaded plunger to move against the valve stem and allow the air to escape from the tire.

A further aspect of the invention is the mounting of a switch member to the same car fender which is also connected to the actuating member. When the car is driven away by the unauthorized person, the pin is removed as before producing a flat and the switch member is simultaneously actuated to set off an alarm, either a warning light or horn, for example.

Other objects and advantages of the invention will be apparent to those skilled in the art upon reference to the following disclosure and description when taken with the accompanying drawings.

Description of the drawing

FIGURE 1 is a side view of an automobile wheel and fender, showing the apparatus of the invention in operative connection therewith.

FIGURE 2 is an enlarged sectional view taken along the line 2—2 of FIGURE 1, showing the detail features of the invention.

FIGURE 3 depicts an alternate embodiment of the invention.

FIGURE 4 is a sectional enlarged view taken along the line 4—4 of FIGURE 3.

FIGURE 5 depicts a further embodiment of the invention, providing a alarm means.

Description of the preferred embodiment

Turning now particularly to FIGURE 1, there is illustrated in side elevational view the rear portion of an automobile including a conventional wheel 10 with tire 11 and rear fender assembly 12. A selectively actuable valve control means 13, the detail construction of which will be set forth later herein, is received onto the valve stem 14 of the tire 11. A cord-like actuating member 15 interconnects a releasable pin 16 operatively related to the valve control means 13 and an anchoring means 17 secured to the underside of the fender 12.

In a preferred embodiment of the invention, the anchoring means 17 comprises a permanent magnet which, when brought into contact with the inner surface of the fender 12, adheres thereto by virtue of its magnetic field. The actuating cord 15 is connected to the magnetic anchoring means 17 via a ring clip means 18.

With the various apparatus elements related as shown in FIGURES 1 and 2, movement of the automobile causes the wheel 10 to rotate, extending the cord-like member 15 a sufficient amount to withdraw the pin 16. In a way that will be more particularly described hereinafter, withdrawal of this pin exerts pressure onto the valve core allowing the air to escape from the tire 11 and thereby producing a "flat." The automobile is now temporarily inoperative, requiring either pumping up the tire or putting on the spare. It is very doubtful that a car thief will be in a frame of mind to do either, and instead will abandon the car.

With particular reference now to FIGURE 2, the valve stem 14 is of generally conventional character, including a valve core 19 that is threadably received within the stem 14. When pressure is exerted on the core in an upward direction as illustrated in FIGURE 2, air is released from the tire. A valve stem extension 20 of conventional construction is seen to include a cylindrical body member 21 enclosing an extension shaft 22 that is resiliently urged by spring 23 for maintaining the actuating button 24 in its outermost (downmost) condition.

When outside contact pressure is exerted against the button 24 sufficient to overcome the reaction of spring 23, the inner end of the shaft 22 has a hub 25 which is brought to bear against core 19 thereby allowing the air to escape from the tire.

The selectively actuable valve escape control means 13 includes a hollow, generally elongate conical shaped body 26 closed at the pointed or small end thereof and open at the large end. At the innermost end of the body cavity, there is included a shell-like actuator 27 having a recess in one end for receiving one end of a compression spring 28, the other end of which spring engages the body wall so that the spring reaction force tends to move the actuator 27 in a direction toward the button 24. The body wall of the valving means 12 further defines an opening 29 passing transversely of the long dimension of the valving means, and of such dimension as to accommodate the pin 16. A similarly shaped opening 30 is formed in the actuator 27 and can be brought into alignment with the opening 29 only when the spring 28 is placed in a compressive state. Accordingly, when the pin 16 is received within the openings 29 and 30 the spring is in a state of compression such that on sudden removal of the pin, the spring will cause the actuator 27 to move outwardly.

The inner surface of the body 26 is further provided with a threaded extent 31 for being received onto similar threads of the valve stem extension member 20. Accordingly, with the pin 16 in place in the openings 29 and 30, the valve control means 13 is then threaded onto the extension member 20 until the actuator 27 contacts the button 24. Removal of the pin 16 now permits the reaction force of the spring 28 to drive the actuator 27 against the button 24, which in turn drives the hub 25 against the core 18 releasing the air from the tire.

FIGURE 3 depicts an alternate form of anchoring means for use in the practice of the invention. Thus, as shown there, an elongated track 40 is affixed to the under surface of the fender 12, with its long dimension substantially parallel to the ground. As best shown in FIGURE 4, the cross-section appearance of the track 40 is somewhat C-shaped, with the ends thereof being received within V-grooves of a slide 32. The slide 32 includes an eyelet 33 which is connected by suitable clip means to the actuating cord 14. In use, the slide is mounted onto the track at either of its ends via V-shaped grooves and moved along the track until the cord-like member 15 becomes taut. Operation is then as in the previously described embodiment. This particular construction for the anchoring means can be especially useful in situations where the under surface of the automobile has become heavily encrusted with scale, mud or an especially thick layer of undercoating which might prevent or substantially impair the ability of a magnet 17 to adhere to the fender.

FIGURE 5 illustrates a still further form of the invention in which an electrical pull switch 34 is actuated at the same time that the actuating pin 16 is withdrawn from the valve control means. Thus, as shown in FIGURE 5, the switch 34 is mounted on a bracket 35, secured to the lower edge of the fender 12 by threaded bolt means 36. The switch 34 has an enlarged or flared mouth portion 37 through which a chain-pull 38 passes with connection made in any conventional manner to the actuating cord 15 and thence to the pin 16. The flared portion 37 permits greater flexibility in locating the bracket 35 on the fender since it will insure proper direction of pull on the pull-chain irrespective of the relative locations of the bracket and valve control means. The extremity of the pin 16 is illustrated in bent condition as at 39 in order to increase the amount of force necessary to remove the pin and in this way provides sufficient force at the other end, i.e., on the pull-chain 38, to actuate the switch 34.

In this embodiment, rotation of the wheel causes both removal of the pin 16, producing a flat tire as aforedescribed, and also actuation of the switch means 34 to energize an alarm such as a light, siren, whistle or horn. Accordingly, in this latter version of the invention, there is provided both the temporary inoperativeness of the automobile as well as a visual or aural indication of unauthorized use of the vehicle.

Although the particular embodiments of the above invention have been shown and described, it will be appreciated that many variations in structure may be employed by those skilled in the art without exceeding the scope of the present invention. The scope of the invention is therefore not to be constructed to be limited to the particular embodiments shown but shall include all modifications and variations thereof, limited solely by the appended claims.

I claim:

1. Apparatus for preventing theft of an automobile, comprising:
    valve core control means received onto the valve stem of one of the automobile tires, including a releasable spring-loaded actuator which upon release bears continuously against the valve core permitting air to escape from the tire, and removable locking means holding the actuating member in spring-loaded condition;
    a motion transmitting member connected to the removable locking means; and
    anchoring means located at a distance from the wheel and connected to the motion transmitting member whereby motion of the automobile removes the locking means spring driving the actuating member against the valve core and letting the air out of the tire said valve core control means includes a hollow body with a threaded open end for being received onto the valve stem of the automobile; the spring-loaded actuator is contained within the hollow body and includes a compression spring compressively held between an actuating member and an inner wall of the hollow body, the reaction force of which spring is directed generally toward the valve core; and the removable locking means including a pin holding the actuator member and spring in the spring-loaded condition, said pin being connected to the motion transmitting member, such that rotation of the wheel removes the pin allowing the spring to drive the actuator against the core and releasing air from the tire.

2. Apparatus for preventing theft of an automobile as in claim 1, in which the anchoring means includes a permanent magnet which is magnetically positioned on the underside of the adjacent automobile fender.

3. Apparatus for preventing theft of an automobile as in claim 1, in which the anchoring means includes an elongated track secured to the underside of the adjacent fender; said track having a guideway, and a slide member received within the guideway to which the motion transmitting member is connected.

4. Apparatus for preventing theft of an automobile as in claim 1, in which there are further provided electrical switch means having mechanical actuating parts, which parts are connected to the motion transmitting member, whereby motion of the automobile causes the switch to be actuated to the "on" condition energizing electrical alarm means interconnected therewith.

5. Apparatus for preventing theft of an automobile as in claim 4, in which the locking means includes a pin passing through aligned openings in a body wall of the valve core control means, the central portions of which pin lock the actuator in spring-loaded attitude, said pin having a first end connected to the motion transmitting member and a second end formed so as to be non-aligned with the openings in the body wall whereby rotation of the wheel removes the pin from the body wall and places the motion transmitting member in sufficient tension to actuate the switch means.

6. Apparatus for preventing theft of an automobile as in claim 1, in which the motion transmitting member includes a cord-like element.

References Cited

UNITED STATES PATENTS

| 1,558,427 | 10/1925 | Bodenhorn | 116—88 |
| 1,876,715 | 9/1932 | Maynard | 81—15.4 |
| 2,600,609 | 6/1952 | Barton | 116—94 |
| 2,894,658 | 7/1959 | Spidy | 222—5 |

FOREIGN PATENTS

| 636,681 | 12/1963 | Belgium. |
| 482,523 | 7/1953 | Italy. |

LOUIS J. CAPOZI, *Primary Examiner.*

U.S. Cl. X.R.

73—146.8; 81—15.4; 251—93